(12) United States Patent
Yajima et al.

(10) Patent No.: US 7,050,188 B1
(45) Date of Patent: May 23, 2006

(54) FACSIMILE APPARATUS

(75) Inventors: Shunsuke Yajima, Nara (JP); Shinichiro Ohashi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 876 days.

(21) Appl. No.: 09/724,192

(22) Filed: Nov. 28, 2000

(30) Foreign Application Priority Data

Nov. 29, 1999 (JP) ................................ P11-337281

(51) Int. Cl.
*G06K 1/00* (2006.01)

(52) U.S. Cl. ................ 358/1.15; 358/400; 379/100.08; 379/100.09

(58) Field of Classification Search ............... 358/1.15, 358/400, 440, 442, 505, 402, 404; 379/100.08, 379/100.09
See application file for complete search history.

(56) References Cited

U.S. PATENT DOCUMENTS

| | | | | |
|---|---|---|---|---|
| 5,134,502 A | * | 7/1992 | Nakatsuma | 358/440 |
| 5,521,719 A | * | 5/1996 | Yamada | 358/438 |
| 5,668,640 A | * | 9/1997 | Nozawa et al. | 358/434 |
| 5,812,279 A | * | 9/1998 | Fukushima et al. | 358/404 |
| 5,852,500 A | * | 12/1998 | Yoshino | 358/440 |
| 6,057,938 A | * | 5/2000 | Abe et al. | 358/400 |
| 6,330,080 B1 | * | 12/2001 | Omori | 358/407 |
| 6,643,291 B1 | * | 11/2003 | Yoshihara et al. | 370/395.5 |
| 2003/0107776 A1 | * | 6/2003 | Maeda | 358/402 |

FOREIGN PATENT DOCUMENTS

| | | |
|---|---|---|
| JP | 10042068 | 2/1998 |
| JP | 11055486 | 2/1999 |

* cited by examiner

*Primary Examiner*—Kimberly Williams
*Assistant Examiner*—Negussie Worku
(74) *Attorney, Agent, or Firm*—Edwards Angell Palmer & Dodge LLP; David G. Conlin; George W. Hartnell

(57) ABSTRACT

An object of the present invention is to provide a facsimile apparatus which increases communication efficiency by classifying destinations into groups. Destinations inputted through an operation panel are classified into groups based on registration data stored in a registration memory of a destination judging section, and stored in a memory. A control section controls transmission of image data by group in the memory.

17 Claims, 5 Drawing Sheets

FACSIMILE APPARATUS

BACKGROUND OF THE INVENTION

1. Field of the Invention

The present invention relates to a facsimile apparatus which has a multi-address transmission function in different communication modes. For example, the invention relates to a facsimile apparatus which is capable of performing transmission while switching as necessary between a peer-to-peer multi-address transmission with a public telephone network and a multi-address transmission with the Internet.

2. Description of the Related Art

In recent years, facsimile apparatuses have become widespread, and not only the frequency of domestic facsimile communication but also the frequency of overseas facsimile communication has become high. However, in the case of establishing long-distance communication with, for example, an overseas destination by facsimile communication through the use of a public telephone network, there is a problem that communication costs get enormously high. Therefore, an Internet-ready facsimile apparatus which performs, in addition to facsimile communication via a public telephone network, facsimile communication by connecting to the Internet has been developed. The Internet-ready facsimile apparatus eliminates the need for communication costs other than fixed costs, and enables large reduction of communication costs in long-distance communication such as overseas communication.

In the case of using this Internet-ready facsimile apparatus, image data of a document to be transmitted is attached to a mail address of a destination and transmitted in the form of an electronic mail to a mail server on the Internet. A facsimile apparatus of the destination periodically checks the mail server to receive data and expands the data to printing data to print it out.

Further, this Internet-ready facsimile apparatus is capable of multi-address transmission of one image data in both the facsimile mode and the electronic mail mode. Up to this time, as shown in Japanese Unexamined Patent Publication JP-A 10-42068 (1998) and Japanese Unexamined Patent Publication JP-A 11-55486 (1999), in the case of multi-address transmission of one image data to destinations in both the facsimile mode and the electronic mail mode, every time when a destination is inputted by abbreviated dialing or the like, the facsimile apparatus judges whether the destination is ready for the facsimile mode with a public telephone network or ready for the electronic mail mode via the Internet, and sequentially performs transmission of the image data based on the results of judgement.

In the case of multi-address transmission of one image data in both the facsimile mode and the electronic mail mode, however, there is a problem as follows. In the case of, every time when one destination is inputted, judging the ready mode of the destination and sequentially performing transmission as in the above conventional method, communication cannot be established with efficiency. Due to characteristics of communication modes, data can be transmitted at a higher speed in the electronic mail mode than in the facsimile mode. However, in the case of, every time when one destination is inputted, judging the ready mode of the destination and transmitting image data in the facsimile mode or the electronic mail mode as in the conventional method, communication in the facsimile mode with a relatively long transmission time and communication in the electronic mail mode with a relatively short transmission time are performed at random. As a result, such an inconvenience occurs that an electronic mail to be instantly transmitted reaches a destination very late, and efficiency of communication decreases as a whole. Particularly, in the electronic mail mode, it is possible to transmit to a plurality of destinations at a time in one mail transmission process. However, in the case of transmitting to the destinations separately, it is necessary to perform a transmission process for each, and therefore it is quite inefficient. Moreover, even when all destinations are of electronic mail mode or all destinations are of facsimile mode, it is necessary to change a conversion mode for every destination in the case where the types of image data compression methods, file formats or the like are different. In this case, when resetting is needed prior to each conversion, resetting is performed again and again before image data is transmitted to all the destinations. As a result, a time for control gets longer and communication efficiency decreases as a whole.

SUMMARY

An object of the present invention is to provide a facsimile apparatus in which communication efficiency is enhanced by gathering the same type of destinations.

The invention has the following configurations in order to solve the above problems.

The invention provides a facsimile apparatus having a function of multi-address transmission of image data in a plurality of different communication modes, comprising a destination judging section for classifying inputted destinations into groups, a memory for storing the classified destinations by group, and a control section for controlling image data transmission by group.

According to the invention, even in the case where a plurality of destinations are inputted, these destinations are classified, and image data transmission is controlled by group. This enables multi-address transmission for each group, and therefore it is possible to transmit with higher efficiency. For example, assuming that there are facsimile and electronic mail communication modes, destination classification into groups of these communication modes enables multi-address transmission to a group of electronic mail mode. In the electronic mail mode, a communication to a lot of destinations is carried out for a time nearly equal to a communication time to one destination. Accordingly, the total communication time becomes extremely short.

Further, in the case where all destination terminals are for electronic mail and formats of attachment are different from each other, the destinations are classified into groups of these formats of attachment and therefore image data may be converted into formats of attachment on a group-by-group basis. Therefore, conversion efficiency increases, with the result that it is possible to transmit with efficiency. In a like manner, in the case where all destination terminals are for facsimile transmission and the resolutions are different from each other, since the destinations are classified by resolution, image data may be converted on a group-by-group basis. Therefore, also in this case, efficient transmission is achieved as a whole.

In the invention it is preferable that the destination judging section is provided with a registration memory for storing registration data including data related to abbreviated dialing or single button dialing of destinations, and when a destination is inputted by abbreviated dialing or single button dialing, the destination judging section reads out data related to the abbreviated dialing or single button dialing of the destination from the registration data of the registration memory and classifies the destination based on the data read from the registration data.

According to the invention, registration data including data related to abbreviated dialing or single button dialing of destinations is stored in the registration memory, and when a destination is inputted by abbreviated dialing or single button dialing, data related to the inputted dialing number is read out from the registration data of the registration memory, so that the need for inputting specific data for classification of destinations is eliminated. Therefore, inputting operation is facilitated, and operational errors can be reduced.

In the invention it is preferable that the data related to abbreviated dialing or single button dialing of destinations includes expression modes of the destinations.

According to the invention, since it is general that the destinations are expressed by telephone numbers in facsimile transmission and by alphabetical characters in electronic mail, classification of the destinations can be easily carried out by the expression modes.

In the invention it is preferable that the data related to abbreviated dialing or single button dialing of destinations includes attribute data of the destinations.

According to the invention, in the case where the registration memory stores not only destinations but also attribute data thereof such as formats of attachment (file formats), resolutions or types of the destinations terminals, inputted destinations are classified based on the attribute data. As a result, it is possible to achieve efficient and reliable classification.

According to the invention, it is possible to classify inputted destinations based on various types of attribute data, and it is possible to easily perform optimal classification as circumstances of the whole system demand or as a use environment demands.

In the invention it is preferable that classification of inputted destinations by the destination judging section is carried out every time when one destination is inputted.

Furthermore, it is preferable that classification of inputted destinations by the destination judging section is carried out when all destinations are inputted.

According to the invention, destinations can be classified at any time as long as before transmission control. Whether the classification is carried out every time of inputting one destination or upon inputting all destinations, transmission is carried out on a group-by-group basis. Which method is better depends on, for example, the design concept of a facsimile apparatus. In the former method with respect to input of one destination, an input buffer can be made small though software processing regarding correction is difficult. In the latter method with respect to input of all destinations, software processing regarding correction is easy, whereas a large input buffer is needed.

In the invention it is preferable that the control section controls transmission of image data sequentially by group.

According to the invention, the control section can control transmission while giving a priority to a group of destinations connected to a network.

Furthermore, in the invention it is preferable that the control section controls transmission of image data by group in parallel.

According to the invention, transmission of image data is controlled by group. This control may be carried out sequentially or may be executed in parallel. Further, in the case of controlling transmission while giving a priority to a group of destinations connected to a network, there is little difference between a communication time to a lot of destinations of this type and a communication time to one destination. Therefore, it is possible to shorten the total communication time and achieve efficient transmission. Herein, the network refers to a network which adopts the TCP/IP protocol or another protocol to establish data communication, and includes a LAN and the Internet.

According to the invention, inputted destinations are classified into groups at first and transmission of image data is controlled by group, so that considerably efficient transmission is allowed. Particularly, in the case where one of communication modes is the electronic mail mode, destinations of electronic mail mode compose one group, whereby it is possible by one control of transmission of image data to send image data to all the destinations of the group. Therefore, it is possible to transmit instantly. By transmitting to this group at first, it is possible to perform transmission with high efficiency as a whole.

Further, use of various types of attribute data as registration data for classifying destinations makes it possible to properly classify in accordance with circumstances, so that it is possible to control transmission with higher efficiency.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
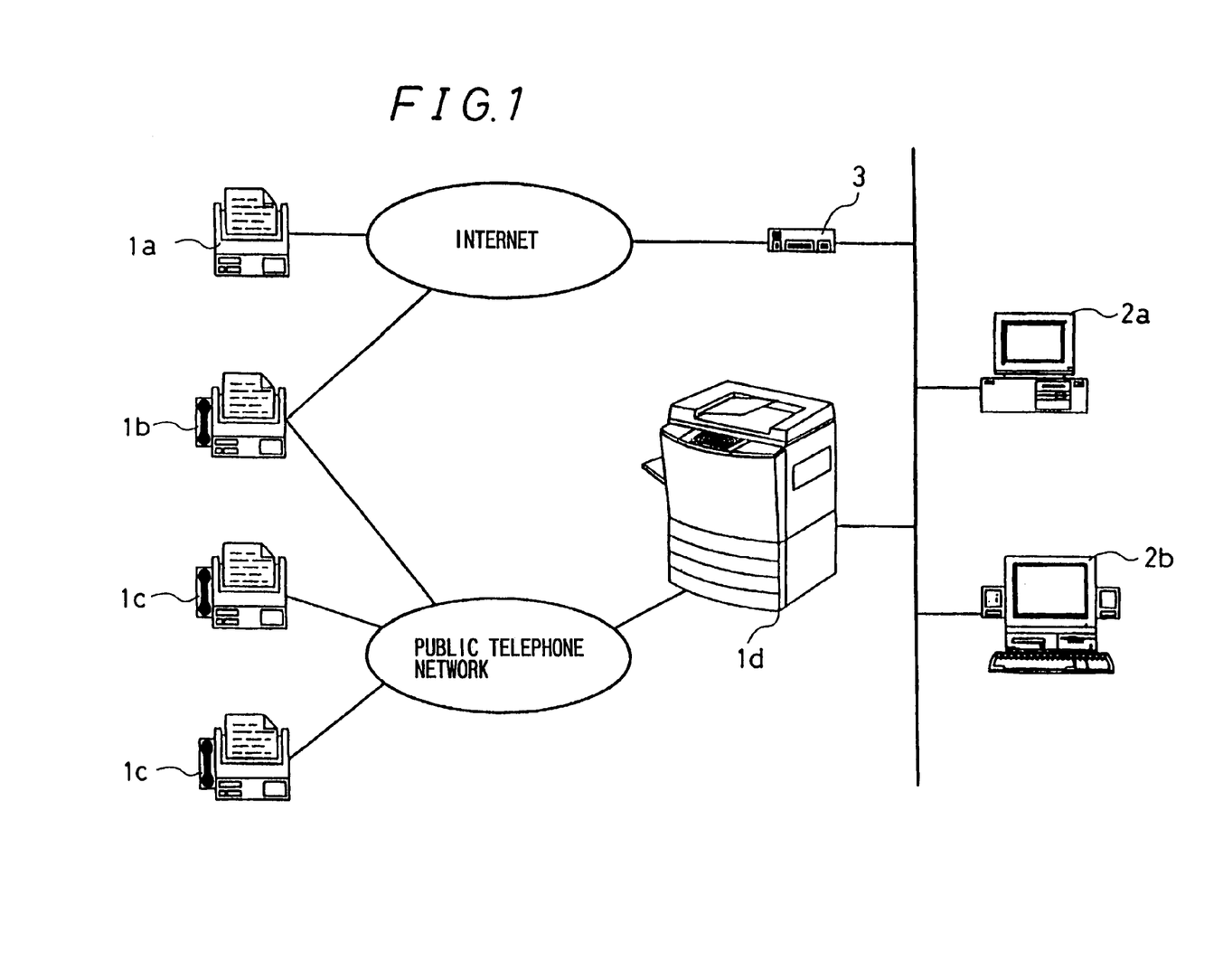
FIG. 1 is a view showing routes of controlling transmission of image data through the use of a facsimile apparatus according to the present invention.

FIG. 1 shows routes of communicating image data through the use of a facsimile apparatus according to the present invention. The types of three facsimile apparatuses 1a–1c are different from each other. The facsimile apparatus 1a is ready for the Internet only, the facsimile apparatus 1b is ready for both the Internet and a public telephone network, and the facsimile apparatus 1c is ready for a public telephone network only. Here, being ready for a public telephone network means being ready for a communication mode by peer-to-peer (one-to-one) connection via a public telephone network. While these facsimile apparatuses 1a–1c are facsimile-dedicated machines, a composite equipment 1d which has both functions of a facsimile apparatus and a copy machine is connected to a public telephone network and a LAN (local area network). Personal computers 2a, 2b are connected to the LAN, and the LAN is connected to the Internet by a router 3. In FIG. 1, the facsimile-dedicated machine 1b which is ready for both the Internet and a public telephone network and the composite equipment 1d which is connected to a public telephone network and a LAN conform to the facsimile apparatus according to the invention.

The facsimile apparatuses 1*a*, 1*b* may be connected to the Internet via a public telephone network.

Figure 2:
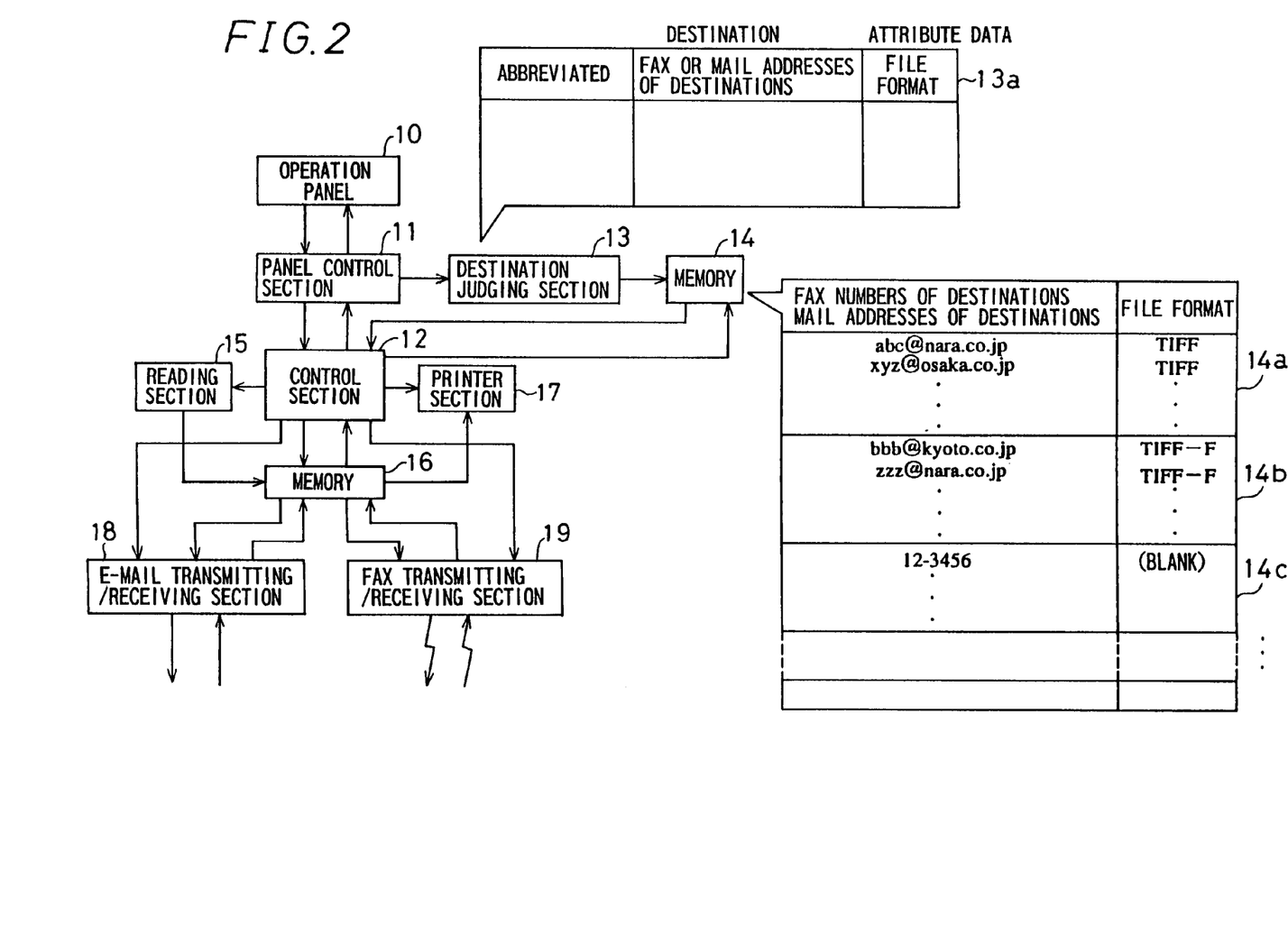
FIG. 2 is a block diagram of a facsimile apparatus of an embodiment of the invention.

FIG. 2 is a block diagram of a facsimile apparatus of an embodiment of the invention.

An operation panel 10 is equipped with a variety of keys and a display, and used for inputting a destination and inputting registration data to be registered in a registration memory which will be mentioned later.

A panel control section 11 processes data inputted through an operation of the operation panel 10, hands the data to a control section 12, and inputs the data to a destination judging section 13.

The destination judging section 13 is equipped with a registration memory 13*a*. The registration memory 13*a* stores the expression mode of a destination associated with abbreviated dialing and attribute data thereof. Here, the expression mode of a destination is expressed by a fax number or mail address of the destination, and attribute data is a form of an attached file in the case where a destination is expressed by a mail address. The destination judging section 13 classifies destinations inputted from the panel control section 11, that is, destinations inputted through the operation panel 10, based on the contents recorded in the registration memory 13*a*. In general, destinations of high transmission frequency are registered in the registration memory 13*a*. It is needless to say that in the case where a fax number or mail address of a destination is directly inputted through the operation panel 10, data in the registration memory would not be used for judging the destination. In this case, the destination is directly classified into a group based on the inputted data.

In a memory 14, destinations classified into groups are stored by group. In an example shown in FIG. 2, a file format of attachment and an expression mode of a destination are registration data for classification. An expression mode of a destination refers to whether the destination is expressed by alphabet letters or numeric characters. As shown in FIG. 2, in the memory 14, destinations are classified into groups 14*a*, 14*b* of alphabet letter expression mode (that is, mail addresses) and a group 14*c* of numeric character expression mode (that is, fax numbers). Further, the groups of mail address are divided in the two groups 14*a*, 14*b* in accordance with attribute data of file forms. As described above, in this embodiment, an expression mode of a destination and a file format of attribute data are used as registration data for classification. In the case where there are attribute data such as resolutions, data compression methods, or types of destination terminals, destinations may be classified based on these registration data.

Accordingly, when abbreviated dialing of a destination is inputted through the operation panel 10, the destination judging section 13 reads out registration data associated with the abbreviated dialing from the registration memory 13*a*, judges which group the inputted destination belongs to based on the read-out registration data, and stores the destination in an appropriate area. Classification of destinations is performed by the destination judging section 13 in a hierarchy form that destinations are classified based on expression modes of the destinations at a first step and further classified by attribute data in groups of the respective expression modes at a second step. As a result, the calculation amount for classification by the destination judging section 13 can be reduced, and classification can be performed with efficiency.

The control section 12 controls the entire facsimile communication. That is to say, in the case of transmitting image data from this facsimile apparatus, this facsimile apparatus transmits image data of a document read by a reading section 15 to a destination through an E-mail transmitting/receiving section 18 or a fax transmitting/receiving section 19. Further, in the case where this facsimile apparatus receives image data from a machine of a destination, this facsimile apparatus outputs the image data received by the E-mail transmitting/receiving section 18 or the fax transmitting/receiving section 19 onto a recording sheet of a printer section 17.

A memory 16 stores the image data read by the reading section 15. The memory is used as a work area in the case of converting the image data into a designated file format, resolution or compression form. Further, the memory is used as a buffer for temporarily storing received image data. Here, the E-mail transmitting/receiving section 18 has a function of executing a communication procedure compliant with the TCP/IP protocol, and is connected to the Internet or a LAN in FIG. 1. In the invention, the network refers to a concept including both a LAN and the Internet. Further, the fax transmitting/receiving section 19 is connected to a public telephone network. Accordingly, in FIG. 1, the facsimile-dedicated machine 1*b* and the composite equipment 1*d* have the E-mail transmitting/receiving section 18 and the fax transmitting/receiving section 19.

When a plurality of destinations are inputted by an operator and classified into groups in the memory 14 as shown in FIG. 2, the control section 12 controls transmission of image data by group. At first, the control section controls transmission of image data to destinations of the group 14*a* and the group 14*b*, and subsequently controls transmission of image data to destinations of the group 14*c*. Accordingly, control of transmission of image data is executed at first from the E-mail transmitting/receiving section 18 to mail addresses of the destinations, and then control of transmission of image data is sequentially executed to fax numbers of the destinations via the fax transmitting/receiving section 19. Further, image data read by the reading section 15 is converted into the TIFF file format and transmitted to the destinations of the group 14*a* as an attached file, whereas the image data is converted into the TIFF-F file format and transmitted to the destinations of the group 14*b* as an attached file. In the invention, the term of "TIFF" refers to "tag image file format". In this case, the control section 12 controls conversion. At first conversion into the TIFF file format is carried out, and then conversion into the TIFF-F file format is carried out. In other words, in a conversion control procedure, change of conversion format is carried out only once. That is to say, in a conversion control procedure, it is enough to once execute such change of conversion mode that read image data is converted to TIFF and thereafter to TIFF-F. In the Internet, when one data is sent to a mail server for transmission, the data is delivered to a plurality of designated mail addresses. Therefore, a time to control transmission of image data via the E-mail transmitting/receiving section 18 is almost constant without reference to the number of mail addresses stored in the groups 14*a*, 14*b*, and a communication time depends only on the volume of an attached file and the communication speed. As a result, the communication time is very short as compared with facsimile transmission.

Further, a destination whose file format is arbitrary and a destination whose file format is unknown may be classified into a group of a file format to which the most destinations belong. For example, by classifying a destination whose file format is arbitrary, into the group 14*a* in the case where there is no destination who belongs to the group 14*b*, it is possible to omit an operation of converting image data to TIFF-F and carry out a next process. Therefore, it is possible to speedily transmit the image data to destinations.

In the case where image data read by the reading section 15 is to be transmitted in a specific file format into which the image data cannot be directly converted, the image data may be converted into another file format which can be converted to the specific file format and thereafter be converted to the specific file format.

In the case where there is a group of destinations to which data can be transmitted in a file format which can be converted to the specific file format, the transmission to the group is carried out before transmission to a group of the specific file format, whereby high speed transmission of image data can be achieved.

After controlling transmission of image data to the mail addresses of the destinations of the groups 14a, 14b in the above manner, the control section 12 sequentially transmits the image data to the respective fax numbers of the destinations stored in the group 14c through the fax transmitting/receiving section 19. That is to say, after transmitting the image data by connecting to a first fax number, the control section controls transmission by connecting to a next fax number in the same manner. After repeating this process to finish control of transmission of the image data to all the fax numbers, the entire communication process is completed. By transmitting electronic mails which need a shorter communication time together prior to fax transmissions which need a longer communication time, it is possible to transmit image data to a lot of destinations as quickly as possible.

Here, every time when one destination is inputted through the operation panel 10, the destination judging section 13 classifies the destination to record it in an appropriate area of the memory 14. The destination judging section 13 may be equipped with a buffer, thereby waiting until all destinations are inputted into this buffer through the operation panel 10 and classifying the destinations stored in the buffer into groups to record them in the memory 14. By carrying out the classification operation only once after all destinations are inputted instead of executing the classification operation again and again every time when a destination is inputted, the classification operation can be executed with high efficiency, and input of destinations can be corrected on a buffer with ease.

In the machine as shown in FIG. 2, the control section 12 transmits image data in the E-mail mode at first, and then transmits image data in the facsimile mode. In the case where the E-mail transmitting/receiving section 18 and the fax transmitting/receiving section 19 can be driven at a time, transmission of image data to the destinations of the group 14a and the group 14c or to the destinations of the group 14b and the group 14c may be controlled in parallel. By thus executing works on electronic mails and faxes of different transmission modes in parallel, it is possible to transmit image data to a lot of destinations as quickly as possible.

Next, an operation of the control section 12 will be explained referring to FIGS. 3, 4.

In the initial state of the facsimile apparatus, a mode which allows input of a destination is selected. When one destination is inputted by abbreviated dialing (s1), a destination associated with the inputted abbreviated dialing is read out from the registration memory 13a, and it is judged whether the destination is expressed by numeric characters or alphabet letters. That is to say, it is judged whether the destination is expressed by a facsimile number or a mail address. In the case where the destination is expressed by a facsimile number, the facsimile number is stored in a storage area of the group 14c (s3). On the other hand, in the case where the destination is expressed by alphabet letters, that is, a mail address, a file format of attribute data is judged (s4). In the case where the file format is the TIFF format, the mail address of the destination is stored in an area of the group 14a (s5), whereas in the case where the file format is the TIFF-F format, the mail address of the destination is stored in an area of the group 14b (s6).

Subsequently, when a next destination is inputted, the above steps s1–s6 are executed. When input of all destinations is completed at step s7, the operation goes to step s8.

In a stage where step s7 is finished, as shown in FIG. 2, all the inputted destinations are classified into groups and stored by group in the memory 14.

Then, when the above steps are finished, a transmission document is read by the reading section 15, and data of the read transmission document is converted into the G3 form of a facsimile data format and stored into the memory 16 (s9).

Next, all the mail addresses of the destinations of the groups 14a, 14b stored in the memory 14 are transferred to the E-mail transmitting/receiving section 18 (s10), and the operation goes to a mail transmission process of step s11. Next, all the fax numbers stored in the area of the group 14c are transferred to the fax transmitting/receiving section 19 (s12), and a fax transmission process is executed (s13).

Figure 4:
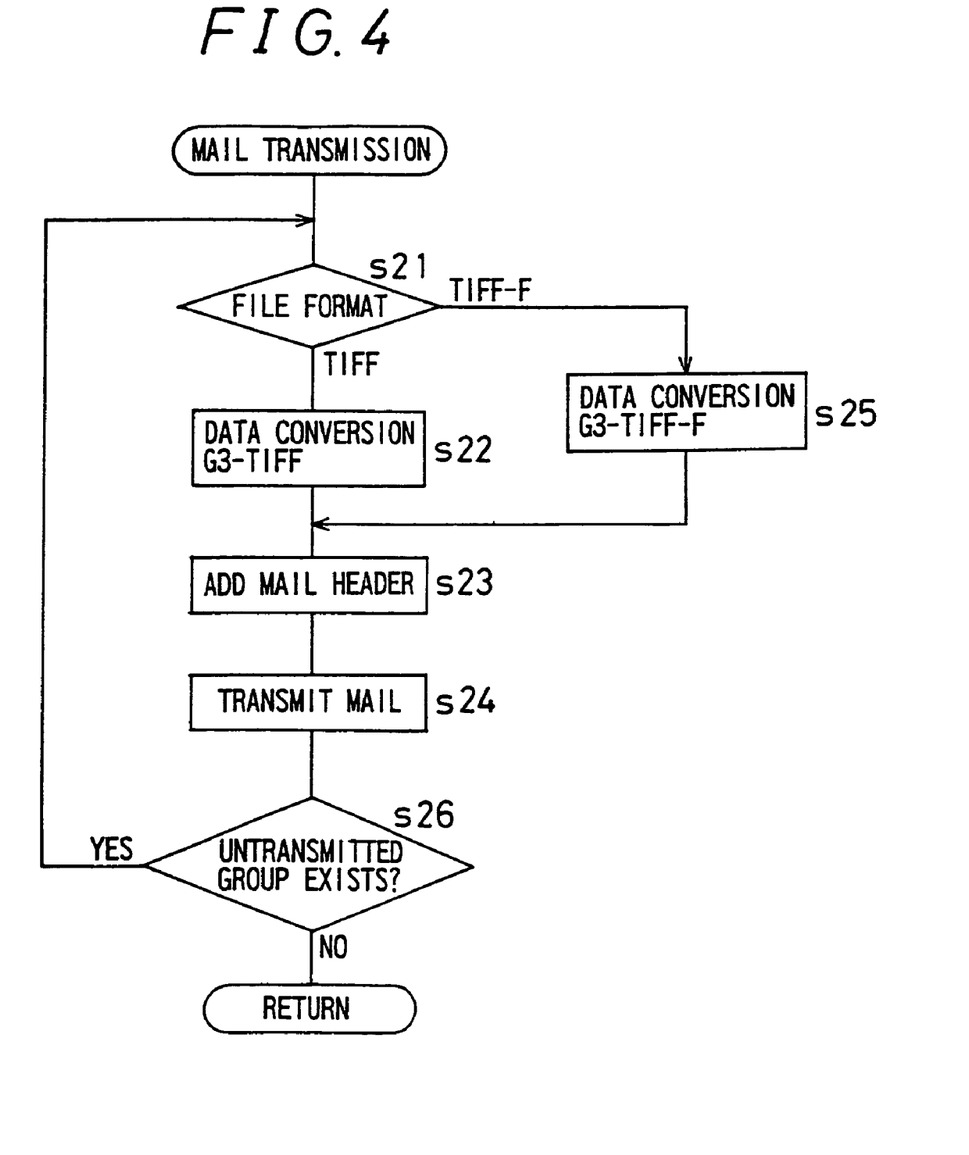
FIG. 4 is a flow chart showing a mail transmission process of the facsimile apparatus.

FIG. 4 shows the mail transmission process of step s11.

At first, the file format is judged (s21). In the case of the TIFF format, the G3 data is converted into the TIFF format (s22), whereas in the case of the TIFF-F file format, the G3 data is converted into the TIFF-F format (s25). Now, assuming that the process is executed with respect to each mail address of the group 14a, the operation goes from step s21 to step s22, where format conversion is executed. Next, attaching the converted image data as an attached file and adding a mail header which includes all the mail addresses of the destinations of the presently processed group, the mail address of this machine, date and so on (s23), one mail is transmitted (s24). Subsequently, a next group is subjected to the process of step s21 and later. When the mail transmission processes to all the groups are finished, the operation returns to step s12 of FIG. 3. According to this mail transmission process, mail transmission at step s24 is executed for the number of groups classified based on file forms. For instance, in the example shown in FIG. 2, there are two file forms, and therefore the mail transmission process is executed twice.

Figure 3:
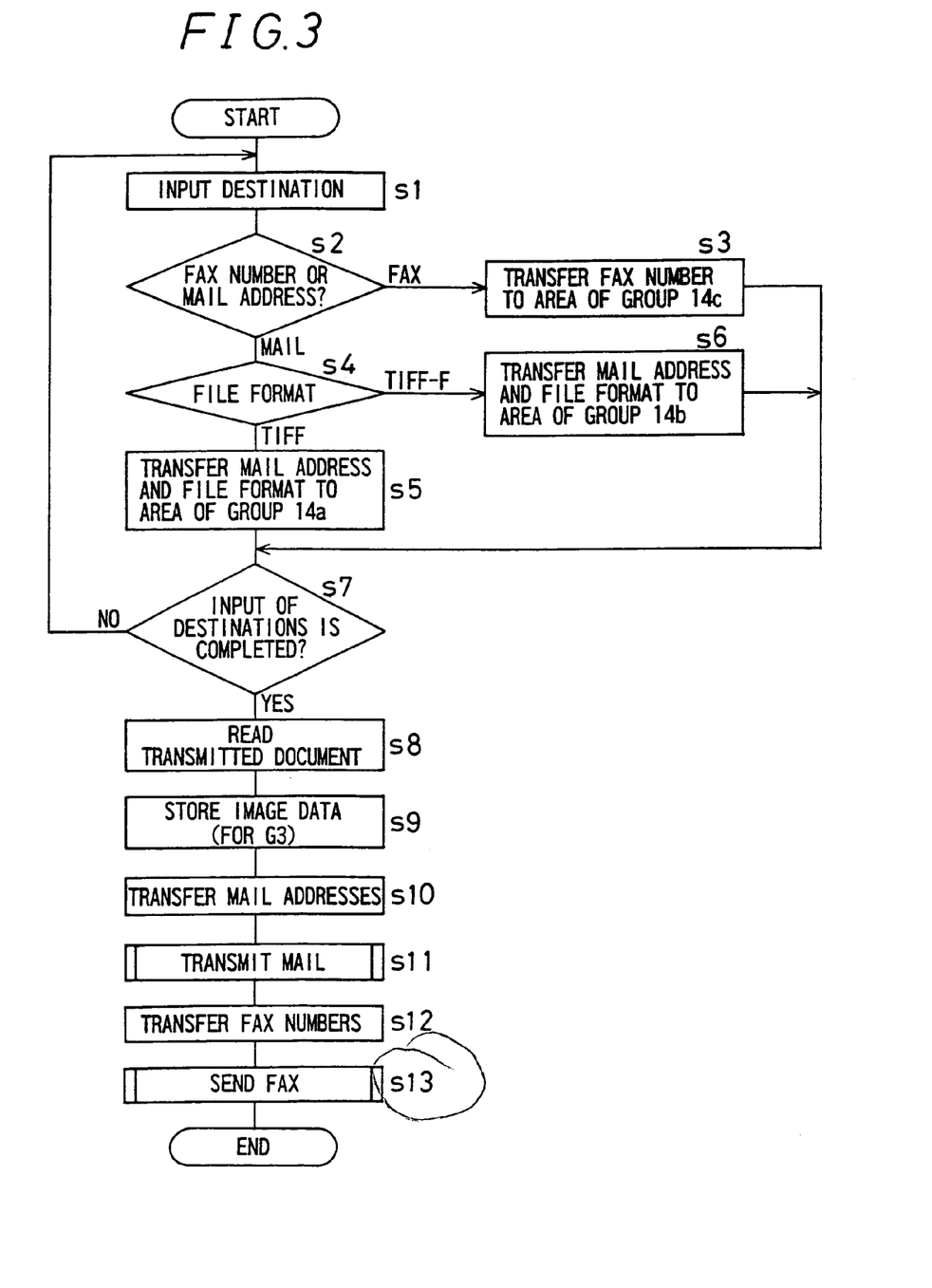
FIG. 3 is a flow chart showing an operation of the facsimile apparatus.
Figure 5:
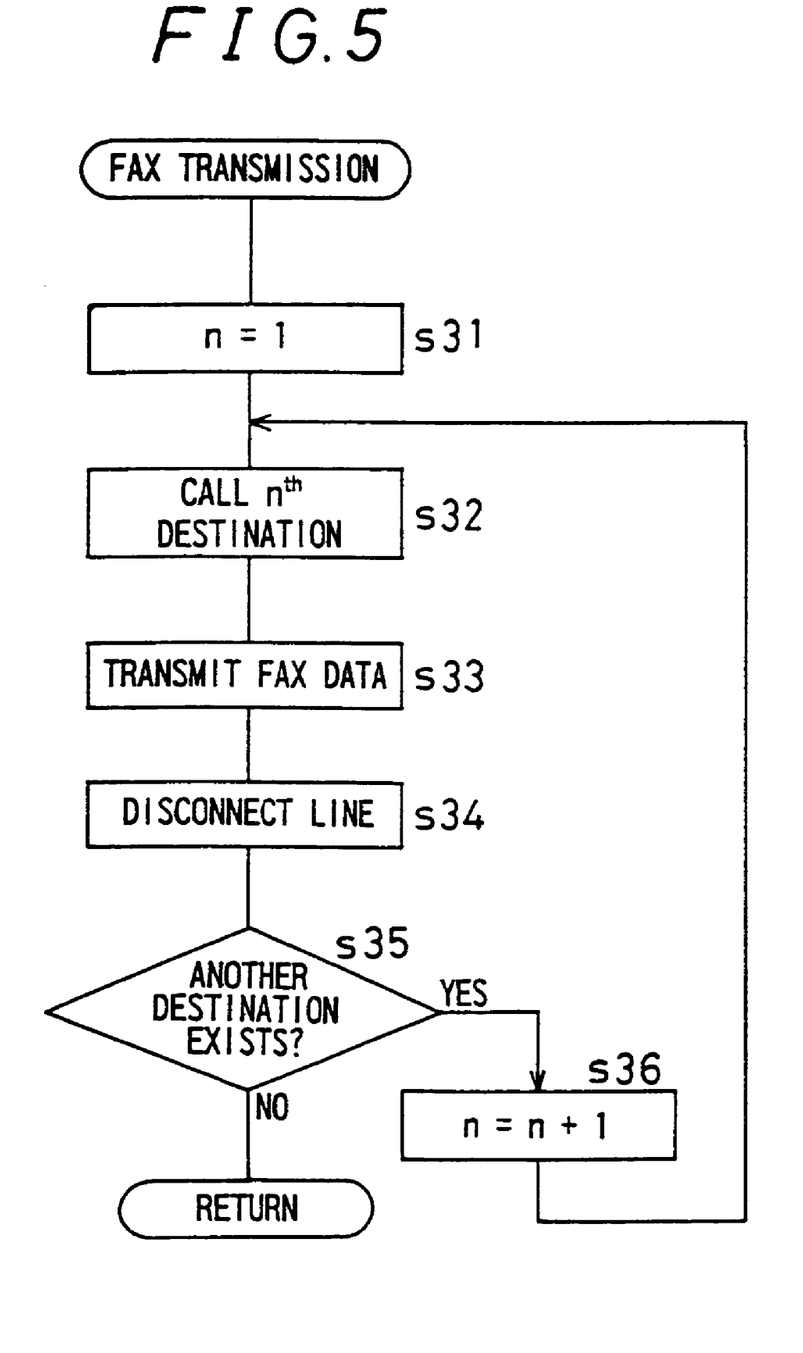
FIG. 5 is a flow chart showing a fax transmission process of the facsimile apparatus.

FIG. 5 shows the fax transmission process shown at step s13 of FIG. 3. According to this fax transmission process, transmission is sequentially performed for each destination. A counter n denotes the number of times of transmission. The $n^{th}$ destination is called at step s32, and fax data is transmitted at step s33. The line of the destination is shut (s34). In the case where a next destination exists (s35), the counter n is incremented by one and the process of step s32 and later is executed.

By executing the mail transmission process at first and executing the fax transmission process subsequently in the above manner, it is possible to instantly transmit to electric-mail-ready destinations, and it is possible to most efficiently perform transmission control to all destinations as a whole.

Although the above embodiment shows a communication mode by electronic mail and a communication mode by facsimile as communication modes, the invention can be applied to other communication modes, for example, a communication mode by radio waves. Further, a destination does not need to be a facsimile apparatus, and it may be a personal computer as long as it has a function of transmitting/receiving image data. As attribute data, a file format is not limited to the TIFF and TIFF-F forms, and may be the forms of PDF, JPEG, MPEG and so on. Resolution (300 dpi, 600 dpi . . . ) of transmission data can be attribute data, and a compression mode (lzh, zip and so on) can be attribute data. It is possible to classify destinations into more small groups based on them.

Further, although the registration memory 13a stores a destination associated with abbreviated dialing, it is also possible to store a destination associated with single button dialing, and it is also possible to directly input a destination and attribute data through the operation panel 10. Although FIG. 3 shows that every time when one destination is inputted, the destination is classified, it is also possible to provide the destination judging section 13 with a buffer, store all the inputted destinations in this buffer, and classify the destinations into groups at a time.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A facsimile apparatus having a function of multi-address transmission of image data in a plurality of different communication media, comprising:
   a destination judging section for classifying inputted destinations into groups;
   a memory for storing the classified destinations by group; and
   a control section for controlling image data transmission by destinations classified by the destination judging section,
      wherein classification of inputted destinations by the destination judging section is carried out every time when one destination is inputted.

2. The facsimile apparatus of claim 1, wherein the destination judging section is provided with a registration memory for storing registration data including data related to abbreviated dialing or single button dialing of destinations, and when a destination is inputted by abbreviated dialing or single button dialing, the destination judging section reads out data related to the abbreviated dialing or single button dialing of the destination from the registration data of the registration memory and classifies the destination based on the data read from the registration data.

3. The facsimile apparatus of claim 2, wherein the data related to abbreviated dialing or single button dialing of destinations includes expression modes of the destinations.

4. The facsimile apparatus of claim 2, wherein the data related to abbreviated dialing or single button dialing of destinations includes attribute data of the destinations.

5. The facsimile apparatus of claim 4, wherein the attribute data includes types of terminals of the destinations.

6. The facsimile apparatus of claim 4, wherein the attribute data includes types of networks to which the destinations are connected.

7. The facsimile apparatus of claim 6, wherein the attribute data includes formats of attachments to be transmitted to the destinations connected to a network.

8. The facsimile apparatus of claim 6, wherein the attribute data includes resolutions of attachments to be transmitted to the destinations connected to a network.

9. The facsimile apparatus of claim 6, wherein the attribute data includes compression methods of data to be transmitted to the destinations.

10. The facsimile apparatus of claim 6, wherein the control section controls transmission while giving a priority to a group of destinations connected to a network.

11. The facsimile apparatus of claim 1, wherein classification of inputted destinations by the destination judging section is carried out when all destinations are inputted.

12. The facsimile apparatus of claim 1, wherein the control section controls transmission of image data sequentially by group.

13. The facsimile apparatus of claim 1, wherein the control section controls transmission of image data by group in parallel.

14. The facsimile apparatus of claim 1, wherein one of the plurality of different communication media is a public switched telephone network.

15. The facsimile apparatus of claim 1, wherein one of the plurality of different communication media is the Internet.

16. A facsimile apparatus having a function of multi-address transmission of image data in a plurality of different communication media, comprising:
   a destination judging section for classifying inputted destinations into groups;
   a memory for storing the classified destinations by group; and
   a control section for controlling image data transmission by destinations classified by the destination judging section,
      wherein classification of inputted destinations by the destination judging section is carried out when all destinations are inputted.

17. A facsimile apparatus having a function of multi-address transmission of image data in a plurality of different communication media, comprising:
   a destination judging section for classifying inputted destinations into groups;
   a memory for storing the classified destinations by group; and
   a control section for controlling image data transmission by destinations classified by the destination judging section,
      wherein the destination judging section is provided with a registration memory for storing registration data including data related to abbreviated dialing or single button dialing of destinations, and when a destination is inputted by abbreviated dialing or single button dialing, the destination judging section reads out data related to the abbreviated dialing or single button dialing of the destination from the registration data of the registration memory and classifies the destination based on the data read from the registration data.

* * * * *